US005965287A

United States Patent [19]

Suzuki et al.

[11] Patent Number: 5,965,287

[45] Date of Patent: Oct. 12, 1999

[54] MAGNETO-OPTICAL ELEMENT MATERIAL AND FARADAY ELEMENT USING THE SAME

[75] Inventors: Toshiyasu Suzuki; Hirotaka Kawai, both of Shizuoka; Hiromitsu Umezawa, Aichi, all of Japan

[73] Assignee: FDK Corporation, Japan

[21] Appl. No.: 08/959,214

[22] Filed: Oct. 28, 1997

[30] Foreign Application Priority Data

| | | | |
|---|---|---|---|
| Oct. 29, 1996 | [JP] | Japan | 8-303629 |
| Mar. 27, 1997 | [JP] | Japan | 9-093139 |
| Jul. 23, 1997 | [JP] | Japan | 9-212506 |

[51] Int. Cl.[6] .......... G11B 5/66

[52] U.S. Cl. .......... 428/694 ML; 428/694 SC; 428/694 GT; 428/694 MM; 428/900; 252/62.51; 252/62.56; 252/62.57; 252/62.58; 252/62.59

[58] Field of Search .......... 428/694 ML, 694 SC, 428/694 GT, 694 MM, 900; 252/62.51, 62.56, 62.57, 62.58, 62.59

[56] References Cited

U.S. PATENT DOCUMENTS

| | | | |
|---|---|---|---|
| 4,788,095 | 11/1988 | Machida | 428/172 |
| 4,883,710 | 11/1989 | Machida | 428/336 |
| 5,501,913 | 3/1996 | Shimokawa et al. | 428/694 ML |
| 5,589,261 | 12/1996 | Tamari | 428/332 |
| 5,607,781 | 3/1997 | Okuno | 428/694 ML |

FOREIGN PATENT DOCUMENTS

| | | |
|---|---|---|
| 62-78194 | 4/1987 | Japan . |
| 4-118623 | 4/1992 | Japan . |
| 4118623 | 4/1992 | Japan . |
| 5-88126 | 4/1993 | Japan . |
| 5-88127 | 4/1993 | Japan . |
| 8-91998 | 4/1996 | Japan . |

OTHER PUBLICATIONS

T. Tamaki et al., "Magneto–optical properties of $(TbBi)_3Fe_5O_{12}$ and its application to 1.5 μm wideband optical isolator", J. Appl. Phys. vol. 70, No. 8, pp. 4581–4583, Oct. 15, 1991.2

T. Tamaki, "Development of a wideband optical isolator for wavelength multiplexing transmission", NHK R&D Report, No. 20, Aug. pp. 8–16, 1992.

R.C. Booth et al., "Magneto–optic properties of rare earth iron garnet cystals in the wavelength range 1.1–1.7 μm and their use in device fabrication", J. Phys. D. Appl. Phys. vol. 17, pp. 579–587, 1984.

(List continued on next page.)

*Primary Examiner*—Leszek Kiliman

*Attorney, Agent, or Firm*—Wenderoth, Lind & Ponack, L.L.P.

[57] ABSTRACT

Disclosed is a magneto-optical element material composed of a magnetic garnet single crystal which is small in temperature dependency of a Faraday rotation angle, capable of being formed into a film by the LPE, and significantly small in wavelength dependency of a Faraday rotation angle in a specific composition region defined by. The magneto-optical element material is composed of a magnetic garnet single crystal expressed by a composition formula of $R_{3-x}Bi_x Fe_{5-v-w-y}Ma_vMb_wCo_yO_{12}$ where R indicates a rare earth element including yttrium, Ma is a trivalent cationic element, and Mb is a tetravalent cationic element; and x, y, v and w satisfy relationships of $0.6 \leqq x \leqq 1.9$, $0.01 \leqq y \leqq 0.47$, $260y-88x+45 \leqq 0$, $500y-30x+37 \leqq 0$, $0 \leqq v \leqq 1.0$, and $0 \leqq w \leqq 0.35$. The material satisfying the following relationships of $0.01 \leqq y \leqq 0.28$ and $800y-130x+45 \leqq 0$ specifically shows improvement in a wavelength dependency of a Faraday rotation angle. Further disclosed is a Faraday element formed by superimposing an A film on a B film for broadening a usable wavelength band region using difference in wavelength dependency of a Faraday rotation coefficient between both the films A and B. The A film is made, by the LPE, from a Bi-substitution type rare earth-iron garnet single crystal not containing Co and the B film is made, by the LPE, from a rare earth-iron garnet single crystal containing Co.

15 Claims, 4 Drawing Sheets

OTHER PUBLICATIONS

K. Egashira et al., "Effects of some transition metal ions on the visible and infrared farady rotation of gadolinium iron garnet", IEEE Transactions on Magnetics, pp. 646–648, Sep. 1972.

K. Tamanoi et al., "Faraday effects of tetrahedrally coordinated $co^{3+}$ in magnetic garnets", Journal of Japan Society of Applied Magnetism, vol. 12, No. 2, pp. 171–174, 1988.

K. Sato et al., "Cotton–mouton spectrum in coblat–substituted magnetic garnet", Journal of Japan Society of Applied Magnetism, vol. 13, No. 2, pp. 157–162, 1989.

Research Report on Trend in Otolectronic Technologies, Optoelectron Industry and Technology Development Association, pp. 97–138, Mar. 1995.

Egashira, et al Effects of some Transition Metal Ions on the visible and Infrared Farady Rotation of Gadolinium Inou Garnet IEEE Transactions on Magnetics, 9, 1972 pp. 646–648.

MAGNETO-OPTICAL ELEMENT MATERIAL AND FARADAY ELEMENT USING THE SAME

BACKGROUND OF THE INVENTION

1. Technical Field of the Invention

The present invention relates to a magneto-optical element material composed of a magnetic garnet single crystal which shows a small temperature dependency of a Faraday rotation angle, capable of being formed into a film by liquid-phase epitaxial growth (hereinafter, referred to as "LPE") method, and demonstrates a significantly small wavelength dependency of a Faraday rotation angle in a specific composition region. The present invention further relates to a Faraday element formed by superimposing an A film on a B film for broadening a usable wavelength band region by making use of a difference in wavelength dependency of a Faraday rotation coefficient between both the films A and B, wherein the A film is made from a Bi (bismuth)-substitution type rare earth-iron garnet single crystal not containing Co (cobalt) and the B film is made from a rare earth-iron garnet single crystal containing Co.

More particularly, the present invention relates to a magneto-optical element material composed of a magnetic garnet single crystal expressed by a composition formula of $R_{3-x}Bi_xFe_{5-v-w-y}Ma_vMb_wCo_yO_{12}$, and, in the meantime, to a Faraday element formed by superimposing an A film on a B film, wherein the A film and the B film are composed of magnetic garnet single crystals expressed by the following composition formulas $R_{3-x}Bi_xFe_{5-y}Ma_yO_{12}$ and $R'_{3-k}Bi_kFe_{5-l-m-n}Mb_1Mc_mCo_nO_{12}$, respectively.

2. Description of the Related Art

In recent years, with an erbium doped fiber amplifier (EDFA) being practically used, a 1550 nm band is being mainly adopted for optical fiber communication. As a magnetic garnet single crystal used in such a wavelength band, there is known, for example, a LPE film (equivalent to Comparative Example 1 which will be described later) having a composition of $Tb_{1.85}Bi_{1.15}Fe_{4.75}Al_{0.25}O_{12}$. One of criteria for evaluating characteristics of such a magnetic garnet single crystal is a Faraday rotation coefficient $\theta_F$ (deg/cm). The larger the absolute value of a Faraday rotation coefficient of a film made from a magnetic garnet single crystal, the thinner the film thickness required to obtain a necessary Faraday rotation angle can be made. This is advantageous in that the film can be easily produced. Another criterion for evaluating characteristics of a magnetic garnet single crystal is a temperature dependency of a Faraday rotation angle. The smaller the temperature dependency of a Faraday rotation angle, the less a change in Faraday rotation angle against a change in external environment temperature. In addition, the reason why the LPE film is adopted is that the LPE method is suitable for mass-production (because of a short time required for growth of the LPE film) and thereby it is low in manufacturing cost, and further it easily allows substitution of Bi which is an element capable of significantly increasing a Faraday rotation angle on the negative side.

In recent years, a wavelength multiple transmission is expected for realizing large capacity optical communication in a 1550 nm band. The wavelength multiple transmission necessitates a wide band type optical isolator. The necessary characteristic of a magnetic garnet single crystal constituting a Faraday rotator of such a wide band type optical isolator is to ensure a small wavelength dependency of a Faraday rotation coefficient. Also the magnetic garnet single crystal is desired to be formed by the LPE method.

Bi-substitution type iron garnet single crystals used in a wide wavelength band, which have variously developed in recent years, are described, for example, in J. Appl. Phys., 70(8), Oct. 15, 1991, and Japanese Patent Laid-open Nos. 4-118623, 5-88126, 5-88127, and 8-91998.

In general, a Faraday rotation angle of a magneto-optical element material is changed depending on an external environment temperature. Accordingly, even if a Faraday rotator is set such that a polarization plane is just 45° rotated at room temperature, the rotation angle of the polarization plane of the Faraday rotator becomes offset from 45° with a change in temperature. As a result, the degree of cancellation of light coming in the reversed direction is lowered, with a result that an isolation characteristic of an optical isolator using the Faraday rotator is deteriorated. For example, the above-described LPE film (equivalent to Comparative Example 1) having the composition of $Tb_{1.85}Bi_{1.15}Fe_{4.75}Al_{0.25}O_{12}$ does not necessarily exhibit a sufficient performance because an isolation characteristic of an optical isolator using the LPE film is considerably deteriorated with a large change in external environment temperature.

The Faraday rotation angle of a magneto-optical element material is also dependent on a wavelength. Accordingly, even if a Faraday rotator is set such that a polarization plane is just 45° rotated with respect to light having a specific wavelength emitted from a light source, the rotation angle of the polarization plane of the Faraday rotator becomes offset from 45° with a change in wavelength of the light emitted from the light source. As a result, the degree of cancellation of light coming in the reversed direction is lowered, so that an isolation characteristic of an optical isolator using the Faraday rotator is deteriorated.

An optical isolator, used for the above-described wavelength multiple transmission expected as large capacity optical communication at a 1550 nm band, is required to exhibit a desirable isolation characteristic at a wide wavelength band having a width of for example ±20 nm centered at 1550 nm, that is, the wavelength band between 1530 nm and 1570 nm. From this viewpoint, the related art magneto-optical element material, for example, equivalent to the above-described Comparative Example 1 has a very larger wavelength dependency of a Faraday rotation coefficient, and therefore, it is unsuitable for such a wide band type optical isolator.

As a material suitable for an optical isolator used in a 1550 nm band, a Bi-substitution type terbium-iron garnet single crystal having a composition of $Tb_{3-x}Bi_xFe_5O_{12}$ is disclosed in the above-described document, J. Appl. Phys., 70(8), Oct. 15, 1991. Such a material having a very small absolute value of a Faraday rotation coefficient, however, is disadvantageous in that it necessitates a large thickness of about 1.5 mm to 2 mm and thereby it enlarges the size of a Faraday rotator using the material for an optical isolator. Another disadvantage is that the magnetic garnet single crystal, which is produced by a flux process, cannot ensure a uniform composition and also it is unsuitable for mass-production because of a longer time required for production. Of magnetic garnet single crystals disclosed in the above-described documents, Japanese Patent Laid-open Nos. 4-118623, 5-88126, and 5-88127, those produced by the flux process exhibit relatively large Faraday rotation coefficients; however, those produced by the LPE method exhibit small absolute values of Faraday rotation coefficients. Further, although the above-described document, Japanese Patent Laid-open No. 8-91998 discloses a technique in which the magnetic garnet material having a similar composition is produced by a solid-phase reaction process for improving a suitability to mass-production; however, the magnetic garnet material also necessitates a large thickness of 1.5 mm to 2 mm, with a result that it is disadvantageous in terms of miniaturization of a Faraday rotator using the material.

SUMMARY OF THE INVENTION

An object of the present invention is to provide a magneto-optical element material in which a temperature dependency of a Faraday rotation angle is small and a Faraday rotation coefficient is large.

Another object of the present invention is to provide a magneto-optical element material in which a wavelength dependency of a Faraday rotation angle is small in a 1550 nm band (typically, between 1530 nm and 1570 nm).

A further object of the present invention is to provide a magneto-optical element material which is suitable for mass-production because it is capable of being formed in a film by the LPE method, whereby it realizes miniaturization and reduction in cost of a wide band type optical isolator using the same.

A still further object of the present invention is to provide a Faraday element having a small wavelength dependency of a Faraday rotation angle in a 1550 nm band, thereby exhibiting a high isolation characteristic.

To achieve the above objects, according to one aspect of the present invention, there is provided a magneto-optical element material used in a 1550 nm band, comprising a magnetic garnet single crystal having a composition formula expressed by $R_{3-x}Bi_xFe_{5-v-w-y}Ma_vMb_wCo_yO_{12}$. Here, R indicates a rare earth element including yttrium, Ma is a trivalent cationic element, and Mb is a tetravalent cationic element. Further, x, y, v and w satisfy relationships of $0.6 \leqq x \leqq 1.9$, $0.01 \leqq y \leqq 0.47$, $260y-88x+45 \leqq 0$, $500y-30x+37 \leqq 0$, $0 \leqq v \leqq 1.0$, and $0 \leqq w \leqq 0.35$. In addition, the 1550 nm band means not only a very narrow wavelength band in the close vicinity of the center wavelength of 1550 nm, but also a wide wavelength band having a specific width enabling wavelength multiple transmission with respect to the center wavelength of 1550 nm (for example, nearly between 1530nm and 1570 nm). The above magnetic garnet single crystal material, if used in a wide wavelength band, preferably has a composition range in which x and y satisfy relationships of $0.01 \leqq y \leqq 0.28$ and $800y-130x+23 \leqq 0$. Further, the magnetic garnet single crystal is preferably formed of a LPE film grown on a non-magnetic garnet substrate by the LPE method.

The present inventors have made various experiments on magneto-optical element materials used in the 1550 nm band, and found that a rare earth-iron garnet single crystal simultaneously substituted for Bi and Co is very smaller in both temperature dependency and wavelength dependency of Faraday rotation than the related art Bi-substitution type rare earth-iron garnet single crystal. The present invention has been accomplished on the basis of the above knowledge. In addition, although a rare earth-iron garnet single crystal containing bivalent Co ions is described in Japanese Patent Laid-open No. 62-78194, the rare earth-iron garnet single crystal simultaneously substituted for Bi and Co is not disclosed at all.

The isolation characteristic in an optical isolator means a ratio of insertion loss between in the forward direction and in the reversed direction. Each of a polarizer and an analyzer made from a rutile single crystal exhibits an extinction ratio of 50 dB or more. As a result, the isolation characteristic of an optical isolator may be determined depending on the extinction ratio of a Faraday rotator. In view of the foregoing, the present invention adopts the following method to evaluate the temperature dependency of a magneto-optical element material. On the basis of the fact that the minimum value of isolation characteristics (at 1550 nm, 25° C.) of iron garnet single crystals in Inventive Examples (Comparative Examples and Experimental Examples) described later is 45 dB, is established the evaluation method including the steps of:

"preparing a 45° rotator using a film of an inventive magneto-optical element material in which an isolation characteristic $K_0$ of the 45° rotator for a wavelength of 1550 nm at 25° C. is 45 dB, obtaining a minimum value $K_{Tmin}$ of isolation characteristics measured at temperatures between 0° C. and 50° C. (25° C., that is, room temperature, ±25° C.), and comparing the minimum value $K_{Tmin}$ thus obtained with that of a related art magneto-optical element material."

Actually, the minimum value $K_{Tmin}$ is calculated on the basis of the following equation. In general, the Faraday rotation angle of a LPE film formed to such a thickness as to generate Faraday rotation of 45° at a temperature $T_0$ (=room temperature, 25° C.), becomes offset from 45° when the temperature is changed from the room temperature $T_0$ to a given temperature T. Here, letting $\Delta\theta_T$ be a difference in Faraday rotation angle between the room temperature $T_0$ and the temperature T, $K_0$ be an isolation characteristic at the room temperature $T_0$, and $K_T$ be an isolation characteristic at the temperature T, the following equation is generally given.

$$K_T = -10 \times \log(10^{-K0/10} + \sin^2\Delta\theta_T) \qquad (1)$$

The isolation characteristic $K_T$ at the temperature T can be obtained by substituting values of $\Delta\theta_T$ and $K_0$ in the equation (1). In addition, $\Delta\theta_T$ can be calculated from measured values of temperature dependencies of the Faraday rotation coefficients. Of the isolation characteristics $K_T$ thus calculated, the minimum value is taken as $K_{Tmin}$.

In the above-described related art TbBi based iron garnet single crystal, $K_0$=45 dB and $K_{Tmin}$=32 dB. On the other hand, in the magnetic garnet single crystal of the present invention, $K_{Tmin} \geqq 33$ dB is given. The reason why $K_{Tmin}>33$ dB is specified is that the isolation characteristic of an optical isolator requires 33 dB at minimum. A composition range of the magnetic garnet single crystal according to the present invention is equivalent to a region surrounded by a dotted line in FIG. 1. In this region shown in FIG. 1, the Bi content x is specified to be 0.6 (/f.u.) or more. The reason for this is as follows: namely, a LPE film cannot grow to a thickness of about 500 μm or more, and accordingly, even in the consideration of a Faraday rotator using two LPE films superimposed to each other, the absolute value of the Faraday rotation coefficient of the single LPE film is required to be 500 (deg/cm) or more. In the film composition of the present invention, the Faraday rotation coefficient becomes 500 (deg/cm) or more when the Bi content is 0.6 (/f.u.) or more. Further, in the region shown in FIG. 1, the Bi content is specified to be 1.9 (/f.u.) or less. The reason for this is as follows: namely, when the Bi content is more than this limit, the thermal expansion coefficient of the LPE film becomes larger, leading to a large difference in thermal expansion coefficient between the substrate and the film, so that there occurs a large stress between the substrate and the film during cooling after growth of the film and thereby the film cannot be substantially formed because of occurrence of cracks.

As a result of experiments, it becomes apparent that a rare earth-iron garnet single crystal having the above-described composition region in which part of the Fe site is simultaneously substituted for Co and Bi in suitable amounts is allowed to reduce the temperature dependency of a Faraday rotation angle and hence to achieve the minimum value $K_{Tmin}$ of isolation characteristics which is in a range of 33 dB or more. In addition, although the magnetic garnet single crystals having the above composition range include those in which the wavelength dependency of a Faraday rotation angle is large, these single crystals can be used at a limited wavelength of 1550 nm without any problem.

Incidentally, the recent experimental wavelength multiple transmission is being performed in a wavelength band having a width 40 nm centered at 1550 nm. This is because wavelengths capable of being amplified by the erbium doped fiber amplifier are in a range of about 1530 nm to 1570 nm. Consequently, an optical isolator used for such a wavelength multiple transmission system is required to have a high isolation characteristic in such a wavelength band, in addition to the reduced temperature dependency.

To evaluate a wavelength dependency of a magneto-optical element material, the present invention adopts a method similar to that for evaluating the temperature dependency. The method includes the steps of:

"preparing a 45° rotator using a film of an inventive magneto-optical element material in which an isolation characteristic $K_0$ of the 45° rotator for a wavelength of 1550 nm at 25° C. is 45 dB, obtaining a minimum value $K_{WLmin}$ of isolation characteristics measured in a wavelength range to which wavelength multiple transmission is applied, that is, in a wavelength range between 1530 nm and 1570 nm which is capable of being amplified by the erbium doped amplifier, and comparing the minimum value $K_{WLmin}$ thus obtained with that of a related art magneto-optical element material."

Actually, the minimum value $K_{WLmin}$ is calculated on the basis of the following equation. In general, the Faraday rotation angle of a LPE film formed to such a thickness as to generate a Faraday rotation angle of 45° at a center wavelength $\lambda_0$ (=1550 nm) becomes offset from 45° when the wavelength is changed from 1550 nm to a given wavelength $\lambda$. Here, letting $\Delta\theta_{WL}$ be a difference in Faraday rotation angle between the center wavelength $\lambda_0$ and the wavelength $\lambda$, $K_0$ be an extinction ratio at the center wavelength $\lambda_0$, and $K_{WL}$ be an isolation characteristic at the wavelength $\lambda$, the following equation is generally given:

$$K_{WL}=-10\times\log\left(10^{-K0/10}+\sin^2\Delta\theta_{WL}\right) \quad (2)$$

The isolation characteristic $K_{WL}$ at the wavelength $\lambda$ can be obtained by substituting values of $\Delta\theta_{WL}$ and $K_0$ in the equation (2). In addition, $\Delta\theta_{WL}$ is calculated from measured values of the wavelength dependencies of the Faraday rotation coefficients. Of these isolation characteristics $K_{WL}$ thus calculated, the minimum value is taken as $K_{WLmin}$.

In the above-described related art TbBi based iron garnet single crystal, $K_0$=45 dB and $K_{WLmin}$=33 dB. On the other hand, in the magnetic garnet single crystal of the present invention having the above composition range in which x and y satisfy relationships of $0\leqq y\leqq 0.28$ and $800y-130x+23\leqq 0$, $K_{WLmin}\leqq 35$ dB is given. In addition, the above composition range is equivalent to a hatching region in FIG. 1.

The reason why the wavelength dependency of a Faraday rotation angle is reduced by substitution of Co in a suitable amount may be considered as follows. A document, Jpn. J. Appl. Mag., 13, 157–162 (1989), discloses a wavelength dependency of a Faraday rotation coefficient for a YIG (yttrium-iron garnet) single crystal substituted for $Co^{2+}$ or $Co^{3+}$. The YIG single crystal substituted for $Co^{2+}$ exhibits a peak of Faraday rotation coefficient at 1440 nm, and the YIG single crystal substituted for $Co^{3+}$ exhibits a peak of Faraday rotation coefficient at 1400 nm. The Faraday rotation coefficient of each of the YIG single crystals is positive at a 1550 nm band. Also, the wavelength dependency of a Faraday rotation coefficient of each of the YIG single crystals has a negative gradient at a 1550 nm band. On the contrary, according to the description of the above document, J. Appl. Phys., 70(8), Oct. 15, 1991, in the case of the Bi-substitution type rare earth-iron garnet single crystal substituted for Bi in an amount of about 0.3 (/f.u.) or more, the Faraday rotation coefficient is negative in a 1550 nm band, and the wavelength dependency of the Faraday rotation coefficient has a positive gradient at a 1550nm band. With respect to the magnetic garnet single crystal of the present invention, it may be considered that by simultaneous substitution of $Co^{2+}$ and Bi, $Co^{3+}$ and Bi, or $Co^{2+}$ and $Co^{3+}$ and Bi, which exhibit the effects of creating wavelength dependencies of Faraday rotation coefficients having reversed gradients in a 1550 nm band, both the effects of Bi and $Co^{2+}$ and/or $Co^{3+}$ are canceled, with a result the wavelength dependency of the Faraday rotation coefficient is substantially reduced.

Incidentally, a method of determining whether Co ions contained in a garnet are bivalent or trivalent is disclosed in a document, Jpn. J. Appl. Mag., 12, 171–174 (1988), as follows:

(a) When being subjected to no electric charge compensation by tetravalent cationic ions, Co ions exist in the form of $Co^{3+}$.

(b) When being subjected to electric charge compensation by tetravalent cationic ions, Co ions exist in the form of $Co^{2+}$ in an amount equivalent to a concentration of the tetravalent cationic ions and the remaining Co ions exist in the form of Accordingly, a ratio between amounts of bivalent Co ions ($CO^{2+}$) and trivalent Co ions ($Co^{3+}$) can be adjusted by controlling the added amount of Mb (tetravalent cationic element), to thereby adjust the negative gradient of the wavelength dependency of the Faraday rotation coefficient in a 1550 nm band. The negative gradient of the wavelength dependency of the Faraday rotation coefficient thus adjusted cancels the positive gradient of the wavelength dependency of the Faraday rotation coefficient obtained by addition of Bi, to thereby realize the Faraday rotation characteristic with no wavelength dependency.

Next, according to another aspect of the present invention, there is provided a Faraday element used in a 1550 nm band, comprising a composite film formed by superimposing an A film on a B film to such a thickness as to generate a synthetic Faraday rotation angle of 45°. The A film is formed, by the LPE method, of a magnetic garnet single crystal having a composition formula expressed by $R_{3-x}Bi_xFe_{5-y}Ma_yO_{12}$ and the B film is formed, by the LPE method, of a magnetic garnet single crystal having a composition formula expressed by $R'_{3-k}Bi_kFe_{5-l-m-n}Mb_lMc_mCo_nO_{12}$. Here, each of R and R' indicates a rare earth element including yttrium, Ma is a trivalent cationic element not including cobalt, Mb is a trivalent cationic element, and Mc is a tetravalent cationic element. Also, x and y satisfy relationships of $0.6\leqq x\leqq 1.9$ and $0\leqq y\leqq 0.5$; and k, l, and m satisfy relationships of $0\leqq k\leqq 0.3$, $0\leqq l\leqq 0.5$, $0\leqq m\leqq 0.23$, and $0.02\leqq n\leqq 0.28$. The above Faraday element is characterized in that the wavelength dependency of a Faraday rotation angle of the A film cancels the wavelength dependency of a Faraday rotation angle of the B film so that the minimum value $K_{min}$ of an isolation characteristic at a 1550 nm band becomes 35 dB or more.

The present inventors have made basic experiments of preparing LPE films of magnetic garnet single crystals having various compositions and measuring them in terms of various characteristics, and found that a rare earth-iron garnet single crystal containing Co is reversed to a Bi-substitution type rare earth-iron garnet single crystal not containing Co in terms of a wavelength dependency of a Faraday rotation coefficient at a wavelength of 1550 nm. In the present invention, there is used, as an index for evaluating the wavelength dependency, a Faraday rotation-wavelength coefficient (FWC) %/nm in a 1550 nm band, which is expressed by the following equation:

$$FWC=(\theta_{F(1570\ nm)}-\theta_{F(1550\ nm)})|\theta_{F(1550\ nm)}|/20\times100$$

where $\theta_{F(1550\ nm)}$ and $\theta_{F(1570\ nm)}$ are Faraday rotation coefficients at 1550 nm and 1570 nm, respectively.

The typical results of the above-described basic experiments are shown in Table 1, and a relationship between a substituted amount of Bi and a Faraday rotation-wavelength coefficient FWC for each sample is shown in FIG. 1.

TABLE 1

| Sample No. | Composition | FWC(%/nm) |
|---|---|---|
| 1 | $Tb_{1.85}Bi_{1.15}Fe_{4.75}Al_{0.25}O_{12}$ | 0.13 |
| 2 | $Tb_{1.70}Y_{0.41}La_{0.14}Bi_{0.75}Fe_5O_{12}$ | 0.13 |
| 3 | $Tb_{1.87}Y_{0.28}La_{0.19}Bi_{0.66}Fe_5O_{12}$ | 0.14 |
| 4 | $Tb_{1.30}Gd_{0.64}La_{0.22}Bi_{0.84}Fe_5O_{12}$ | 0.12 |
| 5 | $Tb_{2.05}La_{0.14}Bi_{0.81}Fe_{4.98}Al_{0.02}O_{12}$ | 0.12 |
| 6 | $Y_{1.63}Bi_{1.37}Fe_5O_{12}$ | 0.15 |
| 7 | $Tb_{1.86}Ho_{0.22}La_{0.22}Bi_{0.70}Fe_5O_{12}$ | 0.12 |
| 8 | $Gd_{1.34}La_{0.04}Bi_{1.62}Fe_5O_{12}$ | 0.14 |
| 9 | $Gd_{1.25}La_{0.05}Bi_{1.70}Fe_5O_{12}$ | 0.15 |
| 10 | $Gd_{1.24}La_{0.05}Bi_{1.71}Fe_5O_{12}$ | 0.15 |
| 11 | $Y_{2.75}Bi_{0.25}Fe_{4.40}Ge_{0.30}Co_{0.30}O_{12}$ | −0.45 |
| 12 | $Y_3Fe_{4.90}Co_{0.10}O_{12}$ | −0.27 |

As will be apparent from Table 1, the Faraday rotation-wavelength coefficient FWC of each of Sample Nos. 11 and 12 containing Co has the negative sign; however, the Faraday rotation-wavelength coefficient FWC of each of the remaining samples not containing Co has the positive sign and is nearly constant (0.12 to 0.15%/nm) irrespective of the kind of the rare earth element and the substituted amount of Bi (see FIG. 3). These results show that a combination of a Bi-substitution type rare earth-iron garnet single crystal not containing Co and a rare earth-iron garnet single crystal containing Co has a possibility in making smaller the wavelength dependency of the Faraday rotation coefficient than that of each of the magnetic garnet single crystals by making use of the reversed relationship of the magnetic garnet single crystals in terms of the wavelength dependency of the Faraday rotation coefficient.

FIG. 4 typically shows the wavelength dependencies of the Faraday rotation coefficients $\theta_F$ of an A film and a B film. The A film (Film No. A-4 in the embodiment described later) is made from a Bi-substitution type rare earth-iron garnet single crystal not substituted for Co, and the B film (Film No. B-4 in the embodiment described later) is made from a rare earth-iron garnet single crystal substituted for Co. The Faraday rotation-wavelength coefficient FWC of the A film not substituted for Co has the positive sign. Besides, the Faraday rotation-wavelength coefficient FWC of the B film substituted for Co has the negative sign near 1550 nm by the effect of Faraday rotation due to addition of Co. Such a phenomenon is observed only for a rare earth-iron garnet containing Co.

Incidentally, the isolation characteristic of an optical isolator means a ratio of insertion loss between in the forward direction and in the reversed direction. To evaluate the performance of a Faraday element, the present invention adopts the following method, which includes the steps of:

"preparing a Faraday element having a synthetic Faraday rotation angle of 45° at a wavelength of 1550 nm by combination of an A film and a B film which are different in the Faraday rotation-wavelength coefficient FWC, producing an optical isolator using the Faraday element in which each of a polarizer and an analyzer is made from a rutile single crystal capable of an extinction ratio of 50 dB or more, measuring isolation characteristics of the optical isolator in a wavelength range of 1530 nm to 1570 nm, and obtaining the minimum value $K_{min}$ (dB) from the measured values, and comparing the performance of the Faraday element with that of a related art one in terms of the minimum value $K_{min}$ (dB)."

In a Bi-substitution type rare earth-iron garnet single crystal, the absolute value of the Faraday rotation coefficient (having the negative sign) becomes larger with an increase in the substituted amount of Bi, so that the film thickness required to obtain the Faraday rotation angle of 45° can be thinned. Also in a Bi-substitution type rare earth-iron garnet single crystal not containing Co, as described above, the Faraday rotation-wavelength coefficient FWC near 1550 nm has the positive sign (note: the Faraday rotation coefficient has the negative sign) and is nearly constant irrespective of the kind of the rare earth element and the Bi content. On the other hand, in a rare earth-iron garnet single crystal substituted for Co, the Faraday rotation-wavelength coefficient FWC near 1550 nm has the negative sign (note: the Faraday rotation coefficient has the positive sign) and is changed depending on the number of valences (bivalence or trivalence) of Co or the substituted amount of Co. As a result, by combination of both the films having different properties such that the film thicknesses are adjusted to generate the synthetic Faraday rotation angle of 45°, the Faraday rotation-wavelength coefficient FWC near 1550 nm of one film can be canceled by that of the other film. In other words, according to the present invention, the Faraday rotation angle is ensured by the A film substituted for Bi and the Faraday rotation-wavelength coefficient FWC is adjusted by the B film containing Co. In addition, the thickness of the A film is set such that the Faraday rotation angle becomes $-(45°+\alpha°$, typically about 50°) and the thickness of the B film is set such that the Faraday rotation angle becomes $+\alpha°$ (typically, about +5°). When the value $\alpha°$ is excessively small, the film thickness is excessively thin, so that the film formation becomes difficult or the effect of canceling the Faraday rotation-wavelength coefficient of the Faraday rotation coefficient to a wavelength is made poor; while when the value $\alpha°$ is excessively large, the film thickness is excessively thick, so that the film formation becomes difficult. As a result, the value $\alpha°$ is preferably set at about 5° as described above. Thus, the wavelength dependencies of the Faraday rotation angles of the A film and the B film are canceled each other as much as possible by adjustment of a ratio between thicknesses of both the films and selection of the composition of each film.

In the present invention, it is preferred that the A film made from a Bi-substitution type rare earth-iron garnet single crystal not containing Co and the B film made of a rare earth-iron garnet single crystal containing Co are separately formed by the LPE and are then superimposed to each other. The separate formation of the films by the LPE is advantageous in that the kind of the substrate material and composition of each film are less limited. In this case, the film, typically the A film, is not necessarily of a single film structure but may be of a multi-level film structure. Further, it may be adopted a configuration in which either of the A film and B film is first formed by the LPE on a non-magnetic garnet substrate, and then the other film is formed thereon by the LPE. In general, a non-magnetic garnet substrate used for film formation by the LPE is removed by polishing for reducing the insertion loss in the forward direction. In addition, it may be adopted a configuration in which the A film is formed on one surface of a non-magnetic garnet substrate by the LPE and the B film is formed on the other surface of the non-magnetic garnet substrate by the LPE. However, such a configuration is not desirable so much because the substrate cannot be removed and thereby the total thickness becomes larger and also the insertion loss is increased.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF THE PREFERRED EMBODIMENTS

A magneto-optical element material of the present invention, which is used in a 1550 nm band, is composed of a magnetic garnet single crystal expressed by $R_{3-x}Bi_xFe_{5-v-w-y}Ma_vMb_wCo_yO_{12}$. Here, depending on the presence or the absence of $Ma_v$ and $Mb_w$ ($0 \leqq v$ and $0 \leqq w$), the above composition formula of the magneto-optical element material may be classified into the following four types:

$R_{3-x}Bi_xFe_{5-y}Co_yO_{12}$ not containing Ma and Mb;

$R_{3-x}Bi_xFe_{5-v-y}Ma_vCo_yO_{12}$ containing only Ma;

$R_{3-x}Bi_xFe_{5-w-y}Mb_wCo_yO$ containing only Mb; and $R_{3-x}Bi_xFe_{5-v-w-y}Ma_vMb_wCo_yO_{12}$ containing both Ma and Mb.

Of these four types, the type "not containing Ma and Mb" is the most basic type. In the composition formula, R is one kind or two or more kinds of rare earth elements selected from a group consisting of Y (yttrium), La (lanthanum), Lu (lutetium), Tb (terbium), and Gd (gadolinium); Ma is one kind or two or more kinds of trivalent cationic elements selected from a group consisting of Al (aluminum), Ga (gallium) and In (Indium); and Mb is one kind or two or more kinds of tetravalent cationic elements selected from a group consisting of Ge (germanium), Sn (tin), Ti (titanium), Zr (zirconium) and Si (silicon). The substitution for a trivalent cationic element is performed mainly to match the lattice constant of a film with that of a substrate upon film formation by the LPE. Also, the substitution for a tetravalent cationic element is performed to control the number of valences of Co (cobalt). The number of valences of Co is changed from trivalence to bivalence depending on substitution for the tetravalent cationic element, to thereby control the negative gradient of the wavelength dependency of a Faraday rotation coefficient due to Co. In a composition range to reduce the wavelength dependency of a Faraday rotation coefficient, the amount w of a tetravalent cationic element may be in a range of $0 \leqq w \leqq 0.23$.

Of magnetic garnet single crystals having the above composition formula, the most preferable example is a magnetic garnet single crystal having a composition of $Tb_{1.86}Bi_{1.14}Fe_{4.67}Al_{0.24}Co_{0.09}O_{12}$ which is formed, by the LPE, on a non-magnetic garnet substrate having a composition of $(CaGd)_3(MgZrGa)_5O_{12}$, or a magnetic garnet single crystal having a composition of $Tb_{2.40}Bi_{0.60}Fe_{4.97}Co_{0.03}O_{12}$ which is formed, by the LPE, on a non-magnetic garnet substrate having a composition of $(CaGd)_3(MgZrGa)_5O_{12}$.

Figure 1:
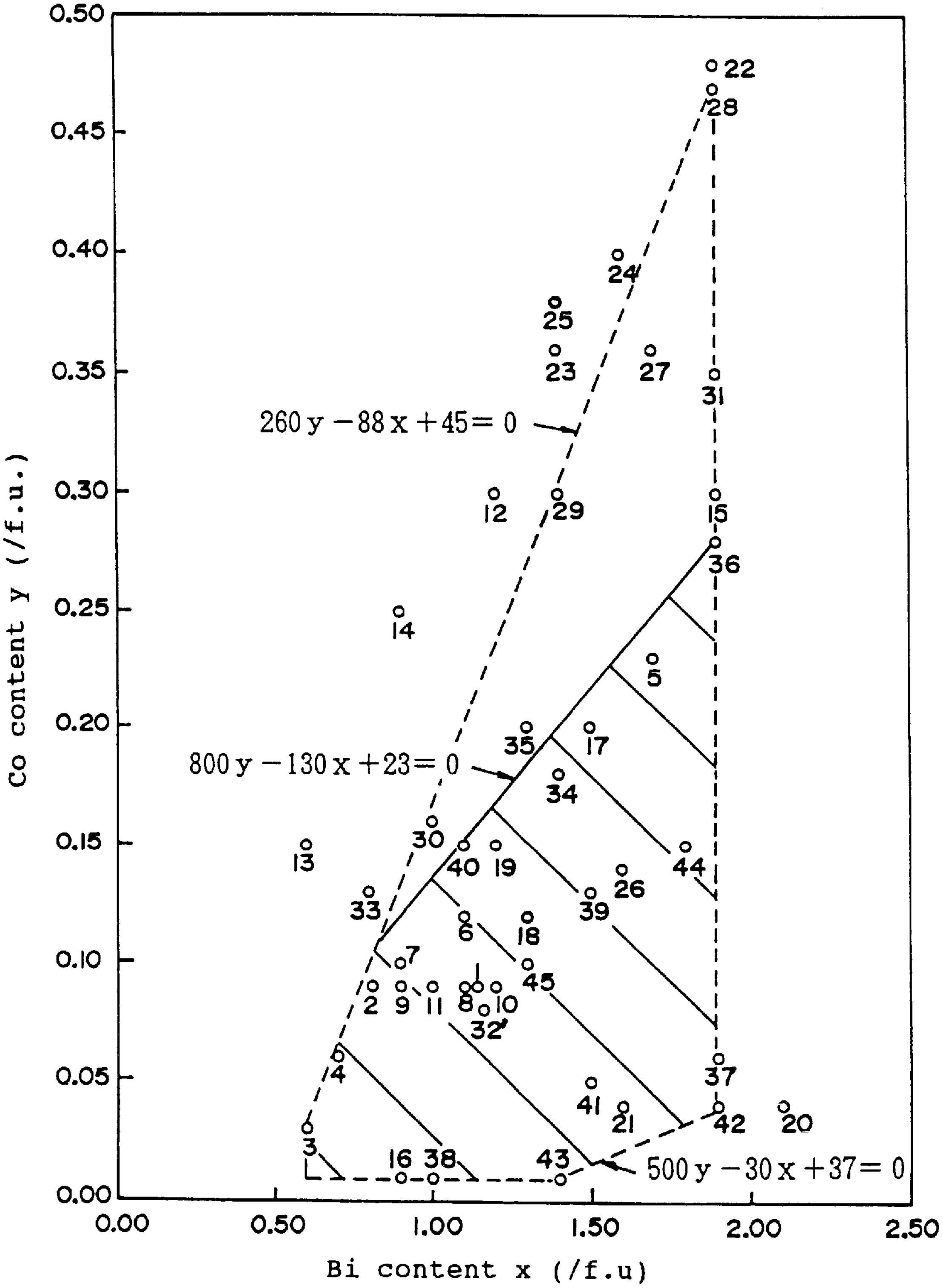
FIG. 1 is a diagram illustrating a composition range of a magneto-optical element material of the present invention with a Bi content x and a Co content y being taken as parameters.

Experiments were made of forming magnetic garnet single crystals having various compositions on non-magnetic garnet substrates by the LPE. $Bi_2O_3$—$B_2O_3$—PbO was commonly used as a flux. A film thickness of each magnetic garnet single crystal was in a range of 40 to 470 $\mu$m. Each magnetic garnet single crystal thus formed was measured in terms of isolation characteristic $K_0$ (dB) for a wavelength of 1550 nm at room temperature (25° C.), Faraday rotation coefficient $\theta_F$ (deg/cm) for a wavelength of 1550 nm at a temperature between 0° C. and 50° C., and Faraday rotation coefficient $\theta_F$ (deg/cm) for a wavelength between 1530 nm and 1570 nm at room temperature. The minimum value $K_{Tmin}$ (dB) of the isolation characteristic in a temperature range of 0° C. to 50° C. was calculated by substituting, in the above-described equation (1), $\Delta\theta_T$ (deg/cm) obtained by standardizing the Faraday rotation angle at 25° C. into 45° on the basis of the Faraday rotation angles $\theta_F$ (deg/cm) measured in a temperature range of 0° C. to 50° C. Actually, $\Delta\theta_T$ is a difference between a Faraday rotation angle $\theta_T$ at a given temperature T and a Faraday rotation angle (45°) at 25° C. (that is, $\Delta\theta_T=|\theta_T-45|$), for a film having such a thickness as to generate the Faraday rotation angle of 45° at 25° C. The minimum value $K_{WLmin}$ (dB) of the isolation characteristics in a wavelength range of 1530 nm to 1570 nm was calculated by substituting, in the above-described equation (2), $\Delta\theta_{WL}$ obtained by standardizing the Faraday rotation angle at 1550 nm into 45° on the basis of the Faraday rotation angles $\theta_F$ (deg/cm) measured in the wavelength range of 1530 nm to 1570 nm. Actually, $\Delta\theta_{WL}$ is a difference between a Faraday rotation angle $\theta_{WL}$ and a Faraday rotation angle (45°) at 1550 nm (that is, $\Delta\theta_{WL}=|\theta_{WL}-45|$), for a film having such a thickness as to generate the Faraday rotation of 45° at 1550 nm. The results of each example are shown in the following, in the order of the composition of a magnetic garnet single crystal; the kind (lattice constant) of a non-magnetic garnet substrate; measured values, that is, a Faraday rotation coefficient $\theta_F$ (deg/cm) and an isolation characteristic $K_0$ for a wavelength of 1550 nm at room temperature (25° C.); and calculated values, that is, the minimum value $K_{Tmin}$ (dB) and the minimum value $K_{WLmin}$ (dB) of isolation characteristics. In addition, each of Comparative Examples does not contain Co, and each of Experimental Examples contain Co. The characteristics of Experimental Examples containing Co were examined with respect to the Bi content x and the Co content y, and are plotted in FIG. 1 as a map. And, the composition range is obtained by such a map. In addition, the numbers in FIG. 1 correspond to those of Experimental Examples.

COMPARATIVE EXAMPLE 1 composition: $Tb_{1.85}Bi_{1.15}Fe_{4.75}Al_{0.25}O_{12}$
substrate: $(CaGd)_3(MgZrGa)_5O_{12}$
(lattice constant=12.496 Å)
measured values: $\theta_F$=−1060 deg/cm, $K_0$=45 dB
calculated values: $K_{Tmin}$=32 dB, $K_{WLmin}$ 33 dB

COMPARATIVE EXAMPLE 2 composition: $Tb_{1.60}Bi_{1.40}Fe_{4.00}Ga_{1.00}O_{12}$
substrate: $(CaGd)_3(MgZrGa)_5O_{12}$
(lattice constant=12.500 Å)
measured values: $\theta_F$=−1130 deg/cm, $K_0$=46 dB
calculated values: $K_{Tmin}$=32 dB, $K_{WLmin}$=33 dB

Experimental Example 1 composition: $Tb_{1.86}Bi_{1.14}Fe_{4.67}Al_{0.24}$ $Co_{0.09}O_{12}$
substrate: $(CaGd)_3(MgZrGa)_5O_{12}$
(lattice constant=12.496 Å)
measured values: $\theta_F$=−802 deg/cm, $K_0$=46 dB
calculated values: $K_{Tmin}$=36 dB, $K_{WLmin}$=44 dB

Experimental Example 2 composition: $Tb_{2.19}Bi_{0.81}Fe_{4.83}Ge_{0.08}Co_{0.09}O_{12}$
substrate: $(CaGd)_3(MgZrGa)_5O_{12}$
(lattice constant=12.496 Å)
measured values: $\theta_F$=−548 deg/cm, $K_0$=47 dB
calculated values: $K_{Tmin}$=41 dB, $K_{WLmin}$=37 dB

Experimental Example 3 composition: $Tb_{2.40}Bi_{0.60}Fe_{4.97}Co_{0.03}O_{12}$
substrate: $(CaGd)_3(MgZrGa)_5O_{12}$
(lattice constant=12.469 Å)
measured values: $\theta_F$=−512 deg/cm, $K_0$=45 dB
calculated values: $K_{Tmin}$=43 dB, $K_{WLmin}$=45 dB

Experimental Example 4 composition: $Tb_{2.30}Bi_{0.70}Fe_{4.94}Co_{0.06}O_{12}$
substrate: $(CaGd)_3(MgZrGa)_5O_{12}$
(lattice constant=12.476 Å)
measured values: $\theta_F$=−506 deg/cm, $K_0$=46 dB
calculated values: $K_{Tmin}$=43 dB, $K_{WLmin}$=41 dB

Experimental Example 5 composition: $Tb_{1.30}Bi_{1.70}Fe_{4.54}Ge_{0.23}Co_{0.23}O_{12}$
substrate: $Nd_3Ga_5O_{12}$
(lattice constant=12.527 Å)
measured values: $\theta_F$=−973 deg/cm, $K_0$=45 dB
calculated values: $K_{Tmin}$=43 dB, $K_{WLmin}$=35 dB

Experimental Example 6 composition: $Tb_{1.90}Bi_{1.10}Fe_{4.83}Ge_{0.05}Co_{0.06}O_{12}$
substrate: $(CaGd)_3(MgZrGa)_5O_{12}$
(lattice constant=12.500 Å)
measured values: $\theta_F$=−755 deg/cm, $K_0$=46 dB
calculated values: $K_{Tmin}$=40 dB, $K_{WLmin}$=41 dB

Experimental Example 7 composition: $Tb_{2.10}Bi_{0.90}Fe_{4.80}Sn_{0.10}Co_{0.10}O_{12}$
substrate: $(CaGd)_3(MgZrGa)_5O_{12}$
(lattice constant=12.494 Å)
measured values: $\theta_F$=−626 deg/cm, $K_0$=46 dB
calculated values: $K_{Tmin}$=40 dB, $K_{WLmin}$=38 dB

Experimental Example 8 composition: $Tb_{1.90}Bi_{1.10}Fe_{4.82}Ti_{0.09}Co_{0.09}O_{12}$
substrate: $(CaGd)_3(MgZrGa)_5O_{12}$
(lattice constant=12.498 Å)
measured values: $\theta_F$=−911 deg/cm, $K_0$=45 dB
calculated values: $K_{Tmin}$=40 dB, $K_{WLmin}$=35 dB

Experimental Example 9 composition: $Tb_{2.10}Bi_{0.90}Fe_{4.82}Zr_{0.09}O_{12}$
substrate: $(CaGd)_3(MgZrGa)_5O_{12}$
(lattice constant=12.496 Å)
measured values: $\theta_F$=−667 deg/cm, $k_0$=45 dB
calculated values: $K_{Tmin}$=42 dB, $K_{WLmin}$=37 dB

Experimental Example 10 composition: $Tb_{1.80}Bi_{1.20}Fe_{4.82}Si_{0.09}Co_{0.09}O_{12}$
substrate: $(CaGd)_3(MgZrGa)_5O_{12}$
(lattice constant=12.496 Å)
measured values: $\theta_F$=−1033 deg/cm, $K_0$=46 dB
calculated values: $K_{Tmin}$=38 dB, $K_{WLmin}$=35 dB

Experimental Example 11 composition: $Tb_{2.00}Bi_{1.00}Fe_{4.81}Al_{0.05}Ge_{0.05}Co_{0.09}O_{12}$
substrate: $(CaGd)_3(MgZrGa)_5O_{12}$
(lattice constant=12.490 Å)
measured values: $\theta_F$=−752 deg/cm, $K_0$=46 dB
calculated values: $K_{Tmin}$=40 dB, $K_{WLmin}$=40 dB

Experimental Example 12 composition: $Y_{1.80}Bi_{1.20}Fe_{4.70}Co_{0.30}O$
substrate: $(CaGd)_3(MgZrGa)_5O_{12}$
(lattice constant=12.480 Å)
measured values: $\theta_F$=−335 deg/cm, $K_0$=46 dB
calculated values: $K_{Tmin}$=41 dB, $K_{WLmin}$=0 dB

Experimental Example 13 composition: $Lu_{1.45}Y_{0.95}Bi_{0.06}Fe_{4.85}Co_{0.15}O_{12}$
substrate: $Gd_3Ga_5O_{12}$
(lattice constant=12.383 Å)
measured values: $\theta_F$=−117 deg/cm, $K_0$=45 dB
calculated values: $K_{Tmin}$=38 dB, $K_{WLmin}$=9 dB

Experimental Example 14 composition: $La_{0.30}Y_{1.80}Bi_{0.90}Fe_{4.75}Co_{0.25}O_{12}$
substrate: $(CaGd)_3(MgZrGa)_5O_{12}$ (lattice constant=12.490 Å)

measured values: $\theta_F$=−156 deg/cm, $K_0$=45 dB calculated values: $K_{Tmin}$=31 dB, $K_{WLmin}$=12 dB Experimental Example 15 composition: $Lu_{0.75}Y_{0.35}Bi_{1.90}Fe_{4.40}Ge_{0.30}Co_{0.30}O_{12}$ substrate: $(CaGd)_3(MgZrGa)_5O_{12}$
(lattice constant=12.497 Å)

measured values: $\theta_F$=−1136 deg/cm, $K_0$=46 dB calculated values: $K_{Tmin}$=42 dB, $K_{WLmin}$=31 dB Experimental Example 16 composition: $Tb_{2.10}Bi_{0.90}Fe_{4.75}Ga_{0.24}Co_{0.01}O_{12}$ substrate: $(CaGd)_3(MgZrGa)_5O_{12}$
(lattice constant=12.484 Å)

measured values: $\theta_F$=−804 deg/cm, $K_0$=45 dB calculated values: $K_{Tmin}$=35 dB, $K_{WLmin}$=36 dB Experimental Example 17 composition: $Tb_{1.50}Bi_{1.50}Fe_{4.30}Al_{0.50}Co_{0.20}O_{12}$ substrate: $(CaGd)_3(MgZrGa)_5O_{12}$
(lattice constant=12.498 Å)

measured values: $\theta_F$=−705 deg/cm, $K_0$=46 dB calculated values: $K_{Tmin}$=40 dB, $K_{WLmin}$=35 dB Experimental Example 18 composition: $Tb_{1.70}Bi_{1.30}Fe_{3.88}Ga_{1.00}Co_{0.12}O_{12}$ substrate: $(CaGd)_3(MgZrGa)_5O_{12}$
(lattice constant=12.501 Å)

measured values: $\theta_F$=−535 deg/cm, $K_0$=46 dB calculated values: $K_{Tmin}$=42 dB, $K_{WLmin}$=35 dB Experimental Example 19 composition: $Tb_{1.80}Bi_{1.20}Fe_{4.70}In_{0.15}Co_{0.15}O_{12}$ substrate: $Nd_3Ga_5O_{12}$
(lattice constant=12.527 Å)

measured values: $\theta_F$=−731 deg/cm, $K_0$=46 dB calculated values: $K_{Tmin}$=42 dB, $K_{WLmin}$=35 dB Experimental Example 20 composition: $Tb_{0.90}Bi_{2.10}Fe_{4.96}Co_{0.04}O$ substrate: $Gd_3Sc_2Ga_3O_{12}$
(lattice constant=12.561 Å)

Note) The film was not formed on the substrate by the LPE because of occurrence of cracks.

Experimental Example 21 composition: $Tb_{1.40}Bi_{1.60}Fe_{4.46}Al_{0.50}Co_{0.04}O_{12}$ substrate: $(CaGd)_3(MgZrGa)_5O_{12}$
(lattice constant=12.499 Å)

measured values: $\theta_F$=−1428 deg/cm, $K_0$=46 dB calculated values: $K_{Tmin}$=33 dB, $K_{WLmin}$=35 dB Experimental Example 22 composition: $La_{0.16}Y_{0.94}Bi_{1.90}Fe_{4.52}Co_{0.48}O_{12}$ substrate: $Gd_3Sc_2Ga_3O_{12}$
(lattice constant=12.561 Å)

measured values: $\theta_F$=−476 deg/cm, $K_0$=45 dB calculated values: $K_{Tmin}$=38 dB, $K_{WLmin}$=3 dB Experimental Example 23 composition: $Y_{1.60}Bi_{1.40}Fe_{4.64}Co_{0.36}O_{12}$ substrate: $(CaGd)_3(MgZrGa)_5O_{12}$
(lattice constant=12.498 Å)

measured values: $\theta_F$=−357 deg/cm, $K_0$=46 dB calculated values: $K_{Tmin}$=39 dB, $K_{WLmin}$=3 dB Experimental Example 24 composition: $Lu_{0.60}Y_{0.80}Bi_{1.60}Fe_{4.60}Co_{0.40}O_{12}$ substrate: $(CaGd)_3(MgZrGa)_5O_{12}$
(lattice constant=12.497 Å)

measured values: $\theta_F$=−438 deg/cm, $K_0$=46 dB calculated values: $K_{Tmin}$=41 dB, $K_{WLmin}$=0 dB Experimental Example 25 composition: $Y_{1.60}Bi_{1.40}Fe_{4.62}Co_{0.38}O_{12}$ substrate: $(CaGd)_3(MgZrGa)_5O_{12}$
(lattice constant=12.499 Å)

measured values: $\theta_F$=−290 deg/cm, $K_0$=45 dB calculated values: $K_{Tmin}$=33 dB, $K_{WLmin}$=10 dB Experimental Example 26 composition: $Tb_{1.40}Bi_{1.60}Fe_{4.72}Ge_{0.14}Co_{0.14}O_{12}$ substrate: $Nd_3Ga_5O_{12}$
(lattice constant=12.527 Å)

measured values: $\theta_F$=−1337 deg/cm, $K_0$=45 dB calculated values: $K_{Tmin}$=37 dB, $K_{WLmin}$=36 dB Experimental Example 27 composition: $Lu_{0.05}La_{0.05}Y_{1.20}Bi_{1.70}Fe_{4.64}Co_{0.36}O_{12}$ substrate: $Nd_3Ga_5O_{12}$
(lattice constant=12.527 Å)

measured values: $\theta_F$=−687 deg/cm, $K_0$=45 dB calculated values: $K_{Tmin}$=37 dB, $K_{WLmin}$=17 dB Experimental Example 28 composition: $La_{0.17}Y_{0.93}Bi_{1.90}Fe_{4.53}Co_{0.47}O_{12}$ substrate: $Gd_3SC_2Ga_3O_{12}$
(lattice constant=12.561 Å)

measured values: $\theta_F$=−512 deg/cm, $K_0$=46 dB calculated values: $K_{Tmin}$=40 dB, $K_{WLmin}$=2 dB Experimental Example 29 composition: $Tb_{1.60}Bi_{1.40}Fe_{4.70}Co_{0.30}O_{12}$ substrate: $Nd_3Ga_5O_{12}$
(lattice constant=12.527 Å)

measured values: $\theta_F$=−532 deg/cm, $K_0$=46 dB calculated values: $K_{Tmin}$=41 dB, $K_{WLmin}$=16 dB Experimental Example 30 composition: $Tb_{2.00}Bi_{1.00}Fe_{4.84}Co_{0.16}O$ substrate: $(CaGd)_3(MgZrGa)_5O_{12}$ (lattice constant=12.498 Å)

measured values: $\theta_F$=−525 deg/cm, $K_0$=45 dB calculated values: $K_{Tmin}$=38 dB, $K_{WLmin}$=27 dB Experimental Example 31 composition: $Lu_{0.75}Y_{0.35Bi1.90}Fe_{4.30}Ge_{0.35}Co_{0.35}O_{12}$ substrate: $(CaGd)_3(MgZrGa)_5O_{12}$ (lattice constant=12.497 Å)

measured values: $\theta_F$=−959 deg/cm, $K_0$=45 dB calculated values: $K_{Tmin}$=35 dB, $K_{WLmin}$=25 dB Experimental Example 32 composition: $Tb_{1.84}Bi_{1.16}Fe_{4.68}Al_{0.24}Co_{0.08}O_{12}$ substrate: $(CaGd)_3(MgZrGa)_5O_{12}$ (lattice constant=12.496 Å)

measured values: $\theta_F$=−962 deg/cm, $K_0$=45 dB calculated values: $K_{Tmin}$=36 dB, $K_{WLmin}$=36 dB Experimental Example 33 composition: $La_{0.40}Y_{1.80}Bi_{0.80}Fe_{4.87}Co_{0.13}O_{12}$ substrate: $(CaGd)_3(MgZrGa)_5O_{12}$ (lattice constant=12.490 Å)

measured values: $\theta_F$=−285 deg/cm, $K_0$=45 dB calculated values: $K_{Tmin}$=35 dB, $K_{WLmin}$=31 dB Experimental Example 34 composition: $Y_{1.60}Bi_{1.40}Fe_{4.82}Co_{0.18}O_{12}$ substrate: $(CaGd)_3(MgZrGa)_5O_{12}$ (lattice constant=12.492 Å)

measured values: $\theta_F$=−798 deg/cm, $K_0$=47 dB calculated values: $K_{Tmin}$=35 dB, $K_{WLmin}$=42 dB Experimental Example 35 composition: $Y_{1.70}Bi_{1.30}Fe_{4.80}Co_{0.20}O_{12}$ substrate: $(CaGd)_3(MgZrGa)_5O_{12}$ (lattice constant=12.485 Å)

measured values: $\theta_F$=−580 deg/cm, $K_0$=46 dB calculated values: $K_{Tmin}$=35 dB, $K_{WLmin}$=34 dB Experimental Example 36 composition: $La_{0.20}Y_{0.90}Bi_{1.90}Fe_{4.72}Co_{0.28}O_{12}$ substrate: $Gd_3Sc_2Ga_3O_{12}$ (lattice constant=12.561 Å)

measured values: $\theta_F$=−913 deg/cm, $K_0$=45 dB calculated values: $K_{Tmin}$=35 dB, $K_{WLmin}$=35 dB Experimental Example 37 composition: $Tb_{1.10}Bi_{1.90}Fe_{4.44}Al_{0.50}Co_{0.06}O_{12}$ substrate: $(CaGd)_3(MgZrGa)_5O_{12}$ (lattice constant=12.510 Å)

measured values: $\theta_F$=−1646 deg/cm, $K_0$=45 dB calculated values: $K_{Tmin}$=33 dB, $K_{WLmin}$=35 dB Experimental Example 38 composition: $Tb_{2.00}Bi_{1.00}Fe_{4.49}Ga_{0.50}Co_{0.01}O_{12}$ substrate: $(CaGd)_3(MgZrGa)_5O_{12}$ (lattice constant=12.486 Å)

measured values: $\theta_F$=−929 deg/cm, $K_0$=47 dB calculated values: $K_{Tmin}$=35 dB, $K_{WLmin}$=36 dB Experimental Example 39 composition: $Tb_{1.50}Bi_{1.50}Fe_{4.87}Co_{0.13}O_{12}$ substrate: $Nd_3Ga_5O_{12}$ (lattice constant=12.527 Å)

measured values: $\theta_F$=−1184 deg/cm, $K_0$=45 dB calculated values: $K_{Tmin}$=35 dB, $K_{WLmin}$=42 dB Experimental Example 40 composition: $La_{0.20}Y_{1.70}Bi_{1.10}Fe_{4.85}Co_{0.15}O_{12}$ substrate: $(CaGd)_3(MgZrGa)_5O_{12}$ (lattice constant=12.491 Å)

measured values: $\theta_F$=−1441 deg/cm, $K_0$=46 dB calculated values: $K_{Tmin}$=35 dB, $K_{WLmin}$=37 dB Experimental Example 41 composition: $Tb_{1.50}Bi_{1.50}Fe_{4.45}In_{0.05}Co_{0.005}O_{12}$ substrate: $Gd_3Sc_2Ga_3O_{12}$ (lattice constant=12.561 Å)

measured values: $\theta_F$=−1273 deg/cm, $K_0$=45 dB calculated values: $K_{Tmin}$=33 dB, $K_{WLmin}$=36 dB Experimental Example 42 composition: $Tb_{1.10}Bi_{1.90}Fe_{3.96}Al_{1.00}Co_{0.04}O_{12}$ substrate: $(CaGd)_3(MgZrGa)_5O_{12}$ (lattice constant=12.487 Å)

measured values: $\theta_F$=−1360 deg/cm, $K_0$=45 dB calculated values: $K_{Tmin}$=33 dB, $K_{WLmin}$=35 dB Experimental Example 43 composition: $Tb_{1.60}Bi_{1.40}Fe_{3.99}Ga_{1.00}Co_{0.01}O_{12}$ substrate: $(CaGd)_3\ (MgZrGa)_5O_{12}$ (lattice constant=12.496 Å)

measured values: $\theta_F$=−1082 deg/cm, $K_0$=45 dB calculated values: $K_{Tmin}$=33 dB, $K_{WLmin}$=35 dB Experimental Example 44 composition: $Lu_{1.20}Bi_{1.80}Fe_{4.85}Co_{0.15}O_{12}$ substrate: $(CaGd)_3(MgZrGa)_5O_{12}$ (lattice constant=12.486 Å)

measured values: $\theta_F$=−1457 deg/cm, $K_0$=46 dB calculated values: $K_{Tmin}$=35 dB, $K_{WLmin}$=40 dB Experimental Example 45 composition: $Lu_{0.60}Gd_{1.10}Bi_{1.30}Fe_{4.90}Co_{0.10}O_{12}$ substrate: $(CaGd)_3(MgZrGa)_5O_{12}$ (lattice constant=12.497 Å)

measured values: $\theta_F$=−1055 deg/cm, $K_0$=45 dB calculated values: $K_{Tmin}$=35 dB, $K_{WLmin}$=36 dB Experimental Example 14 is undesirable because $K_{Tmin}$ is less than 33. Each of Experimental Examples 12 to 14, 22 to 25, and 33 is undesirable because the Faraday rotation coefficient $\theta_F$ is less than 500 deg/cm. Experimental Example 20, which contains Bi in an excessively large amount, fails to form the LPE film. By contrast, each of Experimental Examples 1, 3, 4, 6, 11, 34, 39 and 44 exhibits significantly desirable characteristics with $K_{Tmin}$ of 35 dB or more and $K_{WLmin}$ of 40 dB or more.

Figure 2:
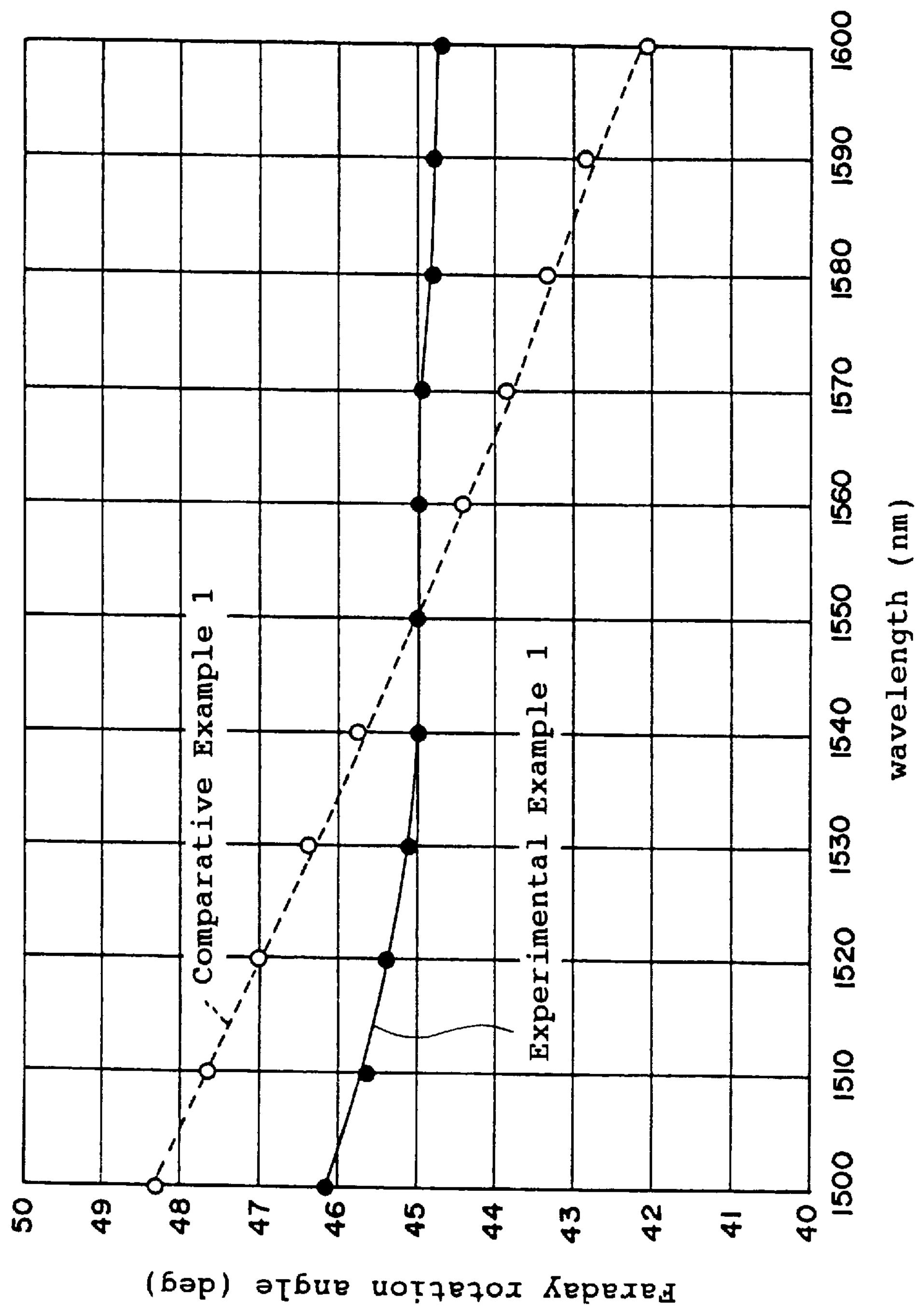
FIG. 2 is a graph showing a wavelength dependency of a Faraday rotation angle for each of Comparative Example 1 and Experimental Example 1.
Figure 3:
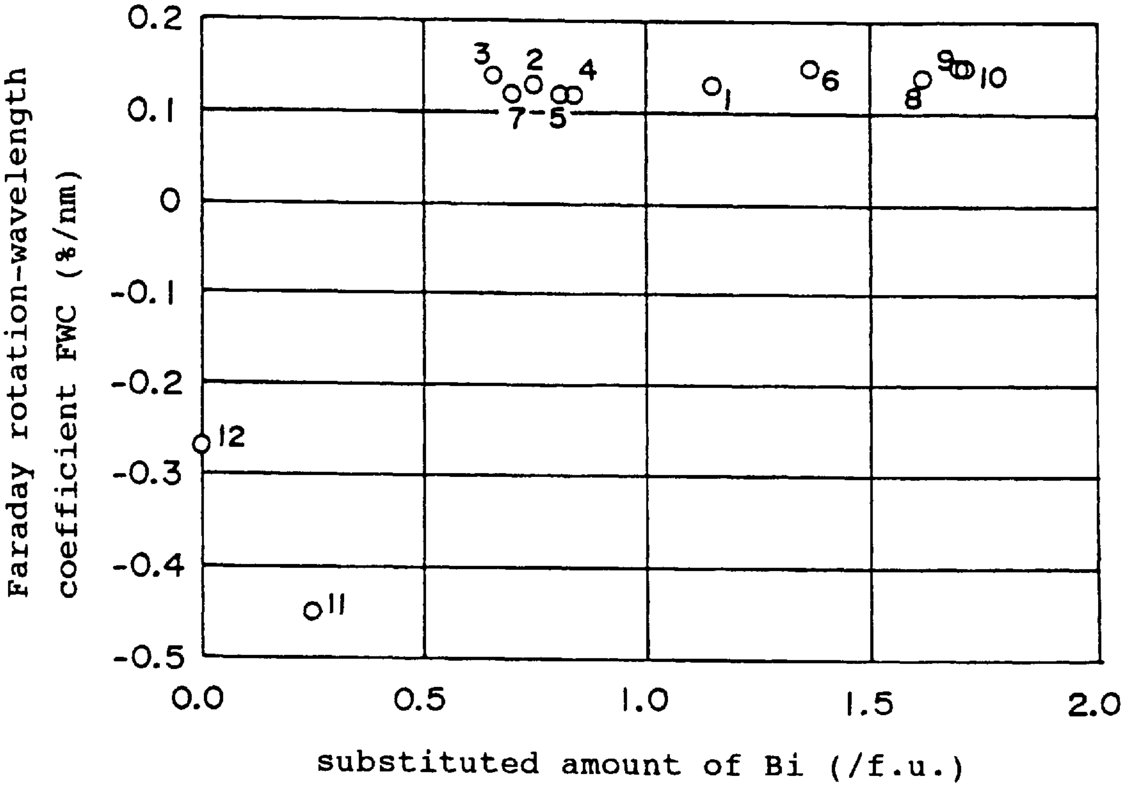
FIG. 3 is a graph showing a relationship between a substituted amount of Bi and a Faraday rotation-wavelength coefficient FWC.
Figure 4:
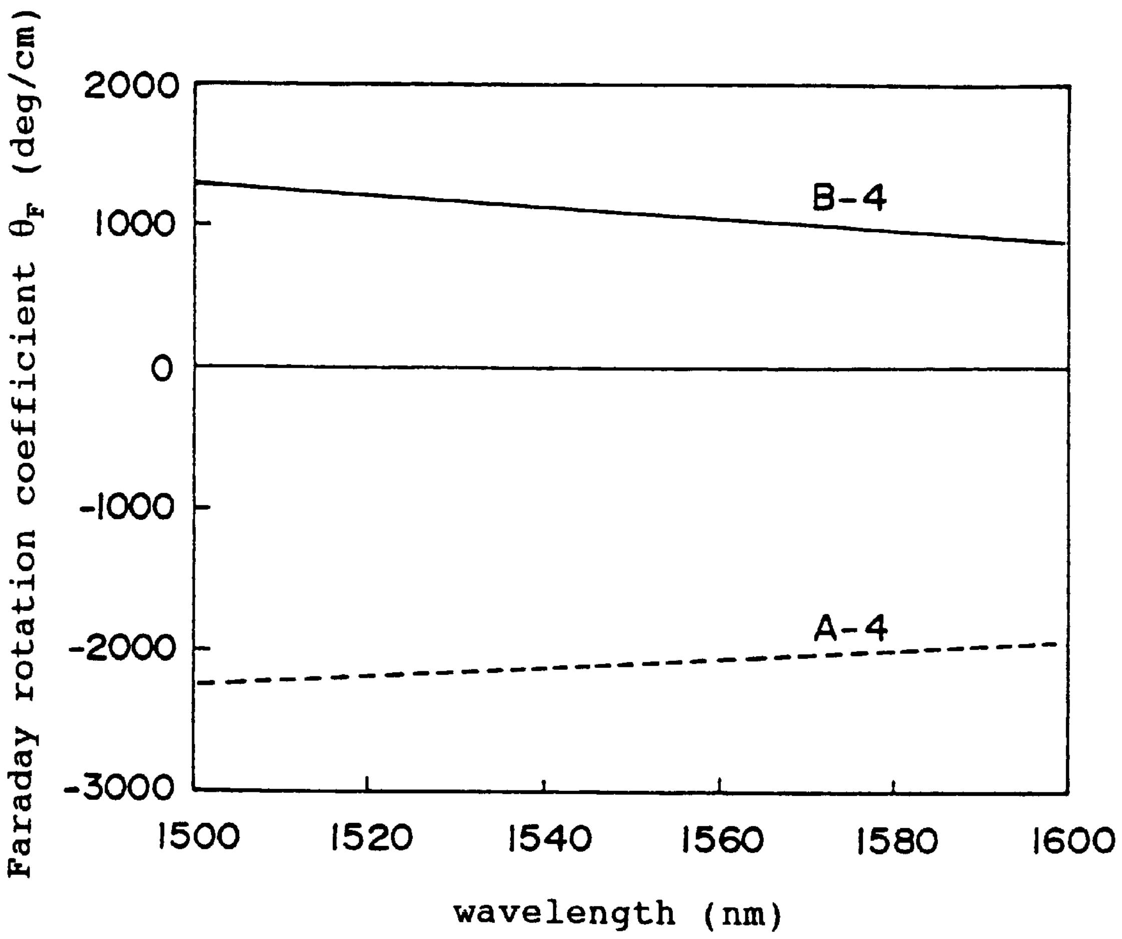
FIG. 4 is a graph showing a wavelength dependency of a Faraday rotation coefficient $\theta_F$ for each of samples of Film Nos. A-4 and B-4.

FIG. 2 shows a wavelength dependency of a Faraday rotation angle of the inventive magnetic garnet single crystal containing Co (Experimental Example 1) in comparison with that of the magnetic garnet single crystal not containing Co (Comparative Example 1). As will be apparent from FIG. 2, in the magnetic garnet single crystal of the present invention simultaneously substituted for Co and Bi in suitable amounts, the change in Faraday rotation angle to the change in temperature is small. Furthermore, as also shown in FIG. 2, some of the magnetic garnet single crystals of the present invention provides smaller change in Faraday rotation angle to the change in wavelength. Particularly the curve of the Faraday rotation angle to a wavelength is almost flattened in a range of 1530 nm to 1570 nm. This means that the Faraday rotation angle of the magnetic garnet single crystal is left as 45° with a change in wavelength insofar as the magnetic garnet single crystal is used in such a wavelength band, and that the isolation characteristic of an optical isolator using the magnetic garnet single crystal is not deteriorated.

Next, a Faraday element using a magneto-optical element material according to another aspect of the present invention will be described. First, an A film is made from a magneto-optical element material having a composition formula expressed by $R_{3-x}Bi_xFe_{5-y}Ma_yO_{12}$ (where, R is a rare earth element including yttrium, Ma is a trivalent cationic element not containing Co, and x and y satisfy relationships of $0.6 \leqq x \leqq 1.9$ and $0 \leqq y \leqq 0.5$. In the above composition formula, preferably, R is one kind or two or more kinds of rare earth elements selected from a group of consisting of Y, Tb, Gd, and La. The reason why the Bi content x is specified to be in the range of $0.6 \leqq x \leqq 1.9$ in the A film is as follows. Namely, when it is excessively large, the Faraday rotation coefficient is increased, while when it is excessively small, the film thickness is required to be significantly thick for ensuring a desired Faraday rotation angle. In particular, since it is generally difficult to grow the film by the LPE to a thickness of 600 μm or more, the Bi content x is desirable to be in a range of $1.15 \leqq x$ in consideration of the one film structure of the magneto-optical element material. On the other hand, when the Bi content x is excessively large, it becomes impossible to grow the film because of occurrence of cracks. Ma is not necessarily contained in the A film; however, substitution of part of the Fe site for Ma which is preferably one kind or two kinds selected from a group consisting of Al, In and Ga is desired to reduce the saturated magnetization of the LPE film, and hence to make small the size of a magnet used for an optical isolator. However, the excessively large substituted amount y of Ma is undesirable because it reduces the Faraday rotation coefficient.

A B film is made from a magnetic garnet single crystal having a composition formula expressed by $R'_{3-k}Bi_kFe_{5-l-m-n}Mb_lMc_mCo_nO_{12}$ (R' is a rare earth element including yttrium, Mb is a trivalent cationic element, Mc is a tetravalent cationic element; and k, 1 and m satisfy relationships of $0 \leqq k \leqq 0.3$, $0 \leqq 1 \leqq 0.5$, $0 \leqq m \leqq 0.23$, and $0.02 \leqq n \leqq 0.28$. In the above composition formula, preferably, R' is one kind or two or more kinds of rare earth elements selected from a group of consisting of Y, Tb and Gd, and part of R' may be substituted for Bi. Mb and Mc are not necessarily contained in the B film; however, if contained in the B film, preferably, Mb is one kind or two or more kinds selected from a group consisting of Al, In and Ga; and Mc is one kind or two or more kinds selected from a group consisting of Ge, Zr, Sn, and Si. The reason why the Co content is limited to a range of $0.02 \leqq n \leqq 0.28$ is as follows: namely, when it is excessively small, the additional effect of Co cannot be exhibited, while when it is excessively large, the minimum value $K_{min}$ of the isolation characteristics in a 1550 nm band is not increased. In addition, substitution for Mb is performed to match the lattice constant of the B film to that of a substrate upon film formation by the LPE, and substitution for Mc is performed for controlling the number of valences of Co. The contents of Mb and Mc may be in the range of $0 \leqq 1 \leqq 0.5$ and in the range of $0 \leqq m \leqq 0.23$, respectively.

Each Bi-substitution type rare earth-iron garnet single crystal (A film) was formed on a non-magnetic garnet substrate by the LPE. $Bi_2O_3$—$B_2O_3$—PbO was used as a flux. The upper half of Table 2 shows compositions and magneto-optical characteristics of samples thus formed (four kinds of Film Nos. A-1 to A-4), and substrates used. In addition, the sample of Film No. A-5 was impossible to be formed because of occurrence of cracks.

As will be apparent from Table 2, the absolute value of the Faraday rotation coefficient becomes larger with an increase in the Bi content. However, when the Bi content x is excessively large (x>1.9), the single crystal does not grow because of occurrence of cracks due to a difference in thermal expansion coefficient between the film and the substrate. The $K_{min}$ of an optical isolator using each film is less than about 33 dB. The sample of Film No. A-1, in which the Bi content is small, is small in Faraday rotation coefficient, so that it must be thick in film thickness or it must be of a multi-level film structure. However, it is difficult to ensure a large film thickness by the LPE, and therefore, the Bi content x is desired to be 1.15 or more.

Similarly, each rare earth garnet single crystal containing Co (B film) was formed on a non-magnetic garnet substrate by the LPE. $B_2O_3$—PbO was used as a flux (note: $Bi_2O_3$—$B_2O_3$—PbO was used only for the sample of Film No. B-2). The lower half of Table 2 shows compositions and magneto-optical characteristics of samples thus formed (13 kinds of samples of Film Nos. B-1 to B-13), and substrates used. It may be considered that the samples of Film Nos. B-1 to B-6 are $Co^{3+}$-substitution films; B-7 to B-11 are $Co^{2+}$-substitution films; and B-12 and B-13 are $Co^{3+}$, $Co^{2+}$-simultaneous substitution films.

As will be apparent from Table 2, each rare earth-iron garnet film substituted for Co in a substituted amount in a range shown in Table 2 has a positive Faraday rotation coefficient. $K_{min}$ in each film is less than 24 dB, which is very lower than that of each B-substitution film. Further, the Faraday rotation-wavelength coefficient FWC in each film has the negative sign. In the sample of Film No. B-7 in which the substituted amount of Bi is 0.02/f.u., the Faraday rotation-wavelength coefficient FWC is –0.14%/nm, the absolute value of which is little different from that of each A film; however, in each film in which the substituted amount of Co is 0.05/f.u. or more, the absolute value of the Faraday rotation-wavelength coefficient FWC is increased, which is significantly deteriorated as compared with that of the conventional Bi-substitution rare earth-iron garnet not substituted for Co.

TABLE 2

| Film No. | | Composition of film | $\theta_F$ | $K_{min}$ | FWC | Composition of Substrate | Lattice Constant |
|---|---|---|---|---|---|---|---|
| | x | | | | | | |
| A-1 | 0.60 | $Tb_{2.00}Y_{0.10}La_{0.30}Bi_{0.60}Fe_5O_{12}$ | −612 | 32 | 0.15 | $(CaGd)_3(MgZrGa)_5O_{12}$ | 12.497 |
| A-2 | 1.15 | $Tb_{1.85}Bi_{1.15}Fe_{4.75}Al_{0.25}O_{12}$ | −1060 | 33 | 0.13 | $(CaGd)_3(MgZrGa)_5O_{12}$ | 12.497 |
| A-3 | 1.40 | $Tb_{1.60}Bi_{1.40}Fe_{4.70}Al_{0.25}Ga_{0.05}O_{12}$ | −1583 | 33 | 0.13 | $(CaGd)_3(MgZrGa)_5O_{12}$ | 12.500 |
| A-4 | 1.90 | $Gd_{1.10}Bi_{1.90}Fe_{4.50}In_{0.17}Al_{0.33}O_{12}$ | −2100 | 33 | 0.15 | $Gd_3Sc_2Ga_3O_{12}$ | 12.561 |
| A-5 | 2.10 | $Tb_{0.90}Bi_{2.10}Fe_5O_{12}$ | — | — | — | $Gd_3Sc_2Ga_3O_{12}$ | 12.561 |
| | n | | | | | | |
| B-1 | 0.06 | $Y_3Fe_{4.89}In_{0.05}Co_{0.06}O_{12}$ | 385 | 23 | −0.23 | $Gd_3Ga_5O_{12}$ | 12.383 |
| B-2 | 0.10 | $Gd_{2.70}Bi_{0.30}Fe_{4.90}Co_{0.10}O_{12}$ | 176 | 16 | −0.47 | $(CaGd)_3(MgZrGa)_5O_{12}$ | 12.485 |
| B-3 | 0.16 | $Tb_3Fe_{4.34}In_{0.50}Co_{0.16}O_{12}$ | 724 | 24 | −0.30 | $(CaGd)_3(MgZrGa)_5O_{12}$ | 12.497 |
| B-4 | 0.23 | $Gd_3Fe_{4.77}Co_{0.23}O_{12}$ | 1097 | 24 | −0.32 | $(CaGd)_3(MgZrGa)_5O_{12}$ | 12.475 |
| B-5 | 0.28 | $Gd_3Fe_{4.67}Ga_{0.05}Co_{0.28}O_{12}$ | 1306 | 24 | −0.32 | $(CaGd)_3(MgZrGa)_5O_{12}$ | 12.476 |
| B-6 | 0.30 | $Y_3Fe_{4.70}Co_{0.30}O_{12}$ | 1390 | 24 | −0.33 | $Gd_3Ga_5O_{12}$ | 12.383 |
| B-7 | 0.02 | $Gd_3Fe_{4.96}Ge_{0.02}Co_{0.02}O_{12}$ | 200 | 21 | −0.14 | $(CaGd)_3(MgZrGa)_5O_{12}$ | 12.467 |
| B-8 | 0.05 | $Gd_3Fe_{4.90}Ar_{0.05}Co_{0.05}O_{12}$ | 299 | 21 | −0.23 | $(CaGd)_3(MgZrGa)_5O_{12}$ | 12.472 |
| B-9 | 0.09 | $Y_3Fe_{4.82}Sn_{0.09}Co_{0.09}O_{12}$ | 431 | 22 | −0.29 | $Gd_3Ga_5O_{12}$ | 12.383 |
| B-10 | 0.14 | $Tb_{1.30}Y_{1.70}Fe_{4.72}Si_{0.14}Co_{0.14}O_{12}$ | 596 | 22 | −0.33 | $Gd_3Ga_5O_{12}$ | 12.383 |
| B-11 | 0.23 | $Gd_3Fe_{4.54}Zr_{0.23}Co_{0.23}O_{12}$ | 893 | 22 | −0.37 | $(CaGd)_3(MgZrGa)_5O_{12}$ | 12.491 |
| B-12 | 0.15 | $Gd_3Fe_{4.75}Ge_{0.05}Al_{0.05}Co_{0.15}O_{12}$ | 714 | 23 | −0.37 | $(CaGd)_3(MgZrGa)_5O_{12}$ | 12.466 |
| B-13 | 0.18 | $Gd_3Fe_{4.77}Ge_{0.05}Co_{0.18}O_{12}$ | 843 | 23 | −0.37 | $(CaGd)_3(MgZrGa)_5O_{12}$ | 12.470 |

Next, 45° Faraday elements were fabricated by combinations of the A films and B films thus formed, and optical isolators were assembled using these 45° Faraday elements. Each of the optical isolators thus assembled was measured in terms of the minimum value $K_{min}$ of the isolation characteristics. The results are shown in Table 3.

TABLE 3

| Experimental Example | Film A | | Film B | | |
|---|---|---|---|---|---|
| | Film No. | Film thickness (μm) | Film No. | Film thickness (μm) | $K_{min}$ (dB) |
| 1* | A-1 | 410 × 2 | B-1 | 135 | 38 |
| 2* | A-2 | 470 | B-2 | 274 | 39 |
| 3* | A-3 | 315 | B-2 | 276 | 36 |
| 4* | A-4 | 238 | B-2 | 283 | 35 |
| 5* | A-3 | 315 | B-3 | 67 | 35 |
| 6** | A-4 | 238 | B-3 | 69 | 44 |
| 7** | A-4 | 238 | B-4 | 45 | 42 |
| 8* | A-4 | 238 | B-5 | 38 | 35 |
| 9 | A-1 | 410 × 2 | B-6 | 37 | 22 |
| 10 | A-2 | 470 | B-6 | 35 | 5 |
| 11 | A-3 | 315 | B-6 | 35 | 16 |
| 12 | A-4 | 238 | B-6 | 36 | 32 |
| 13* | A-1 | 410 × 2 | B-7 | 259 | 39 |
| 14* | A-2 | 470 | B-7 | 241 | 35 |
| 15* | A-1 | 410 × 2 | B-8 | 173 | 39 |
| 16* | A-2 | 470 | B-8 | 161 | 35 |
| 17* | A-2 | 470 | B-9 | 112 | 35 |
| 18* | A-3 | 315 | B-9 | 113 | 35 |
| 19* | A-2 | 470 | B-10 | 81 | 36 |
| 20* | A-3 | 315 | B-10 | 82 | 35 |
| 21* | A-4 | 238 | B-11 | 56 | 35 |
| 22* | A-2 | 470 | B-12 | 68 | 36 |
| 23** | A-3 | 315 | B-12 | 68 | 43 |
| 24* | A-4 | 238 | B-12 | 70 | 37 |
| 25* | A-3 | 315 | B-13 | 58 | 37 |
| 26* | A-4 | 238 | B-13 | 59 | 39 |

In Experimental Examples, the film of Film No. A-1 is of a two-level film structure because the Faraday rotation angle for a single film is small. In Experimental Examples, the synthetic Faraday rotation angle is adjusted at 45° by combination of either of the A films (Film Nos. A-1 to A-4) having four kinds of film thicknesses and either of the B films (Film Nos. B-1 to B-13) having 13 kinds of film thicknesses. Accordingly, each of the combinations of the A films and B films is not necessarily ensure the optimum film thickness ratio therebetween. Each of the combinations suffixed with (*) exhibits the minimum value $K_{min}$ of the isolation characteristics in a range of 35 dB or more, and particularly, each of the combinations suffixed with (**) exhibits the minimum value $K_{min}$ in a range of 42 to 44 dB, which is about 10 dB or more higher than that of the case using the single A film.

In addition, the 45° Faraday element currently used at 1550 nm adopts a LPE film having a composition of $Tb_{1.85}Bi_{1.15}Fe_{4.75}Al_{0.25}O_{12}$, and the minimum value $K_{min}$ of isolation characteristics of an optical isolator using the 45° Faraday element exhibits 33 dB.

As described in detail, the magneto-optical element material according to one embodiment of the present invention comprises a rare earth magnetic garnet single crystal having a specific composition range, which is simultaneously substituted for Bi and Co for specifying a ratio between the Bi content and Co content. An optical isolator including a Faraday rotator using the above single crystal has a small temperature dependency of a Faraday rotation angle against a change in external environment temperature and thereby it ensures a high isolation characteristic. Also, since the magnetic garnet single crystal of the present invention has a Faraday rotation coefficient larger than that of the related art TbBi based garnet single crystal, a Faraday rotator using the single crystal can be thinned and reduced in size. In particular, since the magneto-optical element material of the present invention can be formed by the LPE, it is suitable for mass-production, thus reducing the cost of a wide range type optical isolator including a Faraday rotator using the magneto-optical element material.

Further, according to the present invention, by limiting the substituted amounts of Bi and Co in the above material to more suitable ranges, the wavelength dependency of the Faraday rotation can be minimized in a 1550 nm band. Accordingly, it is possible to prepare a Faraday rotator usable for wavelength multiple transmission in a 1550 nm band, and hence to realize a wide band type optical isolator using such a Faraday rotator.

The Faraday element according to another aspect of the present invention is formed by combination of the A film made from a Bi-substitution type rare earth-iron garnet single crystal not containing Co and the B film made from a rare earth-iron garnet single crystal containing Co in such a manner that the synthetic Faraday rotation angle becomes 45° and the wavelength dependency of the Faraday rotation angle of the A film is canceled by that of the B film. As a result, the minimum value $K_{min}$ of isolation characteristics in a 1550 nm band can be set at 35 dB or more, whereby a wide band type optical isolator usable for wavelength multiple transmission in a 1550 nm band can be realized using such a Faraday element.

What is claimed is:

1. A magneto-optical element material used in a 1550 nm band, comprising a magnetic garnet single crystal having a composition formula expressed by $$R_{3-x}Bi_xFe_{5-v-w-y}Ma_vMb_wCo_yO_{12}$$

where R indicates a rare earth element including yttrium, Ma is a trivalent cationic element, and Mb is a tetravalent cationic element; and x, y, v and w satisfy the following relationships:

$0.6 \leqq x \leqq 1.9$ $0.01 \leqq y \leqq 0.47$ $260y-88x+45 \leqq 0$ $500y-30x+37 \geqq 0$ $0 \leqq v \leqq 1.0$ $0 \leqq w \leqq 0.35$.

2. A magneto-optical element material according to claim 1, wherein x and y satisfy the following relationships:

$0.01 \leqq y \leqq 0.28$ $800y-130x+23 \leqq 0$.

3. A magneto-optical element material according to claim 1, wherein R is one kind or two or more kinds of rare earth elements selected from a group consisting of Y, La, Lu, Tb and Gd.

4. A magneto-optical element material according to claim 1, wherein Ma is one kind or two or more kinds of trivalent cationic elements selected from a group consisting of Al, Ga and In.

5. A magneto-optical element material according to claim 1, wherein Mb is one kind or two or more kinds of tetravalent cationic elements selected from a group consisting of Ge, Sn, Ti, Zr, and Si.

6. A magneto-optical element material according to of claim 1, wherein said magnetic garnet single crystal is grown on a non-magnetic garnet substrate by a liquid-phase epitaxial growth method.

7. A magneto-optical element material used in a 1550 nm band, comprising:

a magnetic garnet single crystal having a composition of $Tb_{1.86}Bi_{1.14}Fe_{4.67}Al_{0.24}Co_{0.09}O_{12}$, wherein said magnetic garnet single crystal is grown on a non-magnetic garnet substrate having a composition of $(CaGd)_3(MgZrGa)_5O_{12}$ by a liquid-phase epitaxial growth method.

8. A magneto-optical element material used in a 1550 nm band, comprising:

a magnetic garnet single crystal having a composition of $Tb_{2.40}Bi_{0.60}Fe_{4.97}Co_{0.03}O_{12}$, wherein said magnetic garnet single crystal is grown on a non-magnetic garnet substrate having a composition of $(CaGd)_3$ $(MgZrGa)_5O_{12}$ by a liquid-phase epitaxial growth method.

9. A magneto-optical element material according to claim 2, wherein said 1550 nm band comprises a wavelength band between 1530 nm and 1570 nm.

10. A Faraday element used in a 1550 nm band, comprising:

a composite film formed by superimposing an A film to a B film to such a thickness as to generate a synthetic Faraday rotation angle of 45°, said A film being formed, by liquid-phase epitaxial growth, of a magnetic garnet single crystal having a composition formula expressed by $$R_{3-x}Bi_xFe_{5-y}Ma_yO_{12}$$

where R indicates a rare earth element including yttrium and Ma is a trivalent cationic element not including Co; and x and y satisfy the following relationships:

$0.6 \leqq x \leqq 1.9$ $0 \leqq y \leqq 0.5$ said B film being formed, by liquid-phase epitaxial growth, of a magnetic garnet single crystal having a composition formula expressed by $$R'_{3-k}Bi_kFe_{5-l-m-n}Mb_lMc_mCo_nO_{12}$$

where R' indicates a rare earth element including yttrium, Mb is a trivalent cationic element, and Mc is a tetravalent cationic element; and k, l, m and n satisfy the following relationships:

$0 \leqq k \leqq 0.3$ $0 \leqq 1 \leqq 0.5$ $0 \leqq m \leqq 0.23$ $0.02 \leqq n \leqq 0.28$, wherein the wavelength dependency of a Faraday rotation angle of said A film is canceled by the wavelength dependency of a Faraday rotation angle of said B film so that the minimum value $K_{min}$ of isolation characteristics in a 1550 nm band is 35 dB or more.

11. A Faraday element according to claim 10, wherein the Bi content x in said A film is in a range of $1.15 \leqq x \leqq 1.9$.

12. A Faraday element according to claim 10, wherein R in said A film is one kind or two or more kinds selected from a group consisting of Y, Tb, Gd and La;

Ma in said A film is one kind or two or more kinds selected from a group consisting of Al, In, and Ga;

R' in said B film is one kind or two or more kinds selected from a group consisting of Y, Tb and Gd;

Mb in said B film is one kind or two or more kinds selected from a group consisting of Al, In, and Ga; and Mc in said B film is one kind or two or more kinds selected from a group consisting of Ge, Zr, Sn, and Si.

13. A Faraday element according to claim 10, wherein said 1550 nm band comprises a wavelength band between 1530 nm and 1570 nm.

14. A magneto-optical element material according to claim 7, wherein said 1550 nm band comprises a wavelength band between 1530 nm and 1570 nm.

15. A magneto-optical element material according to claim 8, wherein said 1550 nm band comprises a wavelength band between 1530 nm and 1570 nm.

* * * * *